US012610300B2

(12) United States Patent
Hathiramani et al.

(10) Patent No.: US 12,610,300 B2
(45) Date of Patent: Apr. 21, 2026

(54) METHOD, APPARATUS AND COMPUTER PROGRAM

(71) Applicant: Nokia Technologies Oy, Espoo (FI)

(72) Inventors: Navin Hathiramani, Coppell, TX (US);
Samuli Heikki Turtinen, Ii (FI);
Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/176,317

(22) Filed: Apr. 11, 2025

(65) Prior Publication Data

US 2025/0240695 A1    Jul. 24, 2025

Related U.S. Application Data

(63) Continuation of application No. 18/172,888, filed on Feb. 22, 2023.

(51) Int. Cl.
*H04W 4/00*       (2018.01)
*H04W 36/32*      (2009.01)
*H04W 72/1263*    (2023.01)

(52) U.S. Cl.
CPC ..... *H04W 36/324* (2023.05); *H04W 72/1263* (2013.01)

(58) Field of Classification Search
CPC ........................ H04W 36/324; H04W 72/1263
USPC ......................................................... 370/331
See application file for complete search history.

(56) References Cited

U.S. PATENT DOCUMENTS

| | | | | |
|---|---|---|---|---|
| 9,281,931 B2* | 3/2016 | Kwon | ............... | H04W 52/0219 |
| 9,565,701 B2* | 2/2017 | Quan | ............... | H04W 74/0838 |
| 9,894,684 B2* | 2/2018 | Park | ..................... | H04L 61/10 |
| 10,021,601 B2* | 7/2018 | Zhang | ............... | H04W 74/0866 |
| 10,462,709 B2* | 10/2019 | Hong | ............... | H04W 36/0016 |
| 10,856,201 B2* | 12/2020 | Hong | ..................... | H04W 8/08 |
| 11,172,513 B2* | 11/2021 | Zhou | ..................... | H04L 5/0048 |
| 11,172,514 B2* | 11/2021 | Kim | ................. | H04W 36/0005 |
| 11,265,774 B2* | 3/2022 | Zhang | ................... | H04W 12/37 |
| 11,412,422 B2* | 8/2022 | Rastegardoost | ...... | H04W 36/08 |
| 11,653,393 B2* | 5/2023 | Rastegardoost | .. | H04W 36/0077 |
| | | | | 370/329 |
| 11,838,944 B2* | 12/2023 | Kim | ................... | H04B 7/06964 |
| 11,849,429 B2* | 12/2023 | Wager | ............... | H04W 74/0838 |
| 12,041,502 B2* | 7/2024 | Tsuboi | ................. | H04W 76/10 |
| 12,069,582 B2* | 8/2024 | Cirik | ................. | H04W 52/242 |
| 12,156,083 B2* | 11/2024 | Park | ................. | H04W 36/0058 |
| 12,244,456 B2* | 3/2025 | Cirik | ................. | H04B 7/06964 |
| 12,294,897 B2* | 5/2025 | Wang | ............... | H04W 36/0016 |
| 2010/0208696 A1* | 8/2010 | Lee | ................... | H04W 36/0064 |
| | | | | 370/331 |
| 2012/0218973 A1* | 8/2012 | Du | ......................... | H04W 36/18 |
| | | | | 370/331 |
| 2013/0022023 A1* | 1/2013 | Aydin | ............... | H04W 36/0069 |
| | | | | 370/331 |
| 2017/0034853 A1* | 2/2017 | Rune | ................. | H04W 74/0838 |

(Continued)

*Primary Examiner* — Amancio Gonzalez

(74) *Attorney, Agent, or Firm* — McCarter & English LLP

(57) ABSTRACT

There is provided a user equipment including at least one processor and at least one memory storing instructions that, when executed by the at least one processor, cause the user equipment at least to: receive, from a source cell entity, a physical downlink control channel command; and based on the physical downlink control channel command, initiate a random access procedure to one or more target cells.

20 Claims, 8 Drawing Sheets

(56)                    References Cited

U.S. PATENT DOCUMENTS

| | | | | |
|---|---|---|---|---|
| 2021/0136641 | A1* | 5/2021 | Roy .................... | H04W 36/249 |
| 2022/0167235 | A1* | 5/2022 | Geng ............. | H04W 36/00837 |
| 2022/0394577 | A1* | 12/2022 | Yan ..................... | H04W 36/185 |
| 2023/0048364 | A1* | 2/2023 | Varsier ............... | H04B 7/15542 |
| 2023/0131368 | A1* | 4/2023 | Jang ..................... | H04W 24/08 |
| | | | | 370/216 |
| 2023/0138737 | A1* | 5/2023 | Hong ................... | H04W 76/28 |
| | | | | 370/329 |
| 2023/0156857 | A1* | 5/2023 | Hong ................. | H04W 52/028 |
| | | | | 370/328 |
| 2023/0217448 | A1* | 7/2023 | Sun ....................... | H04L 5/0057 |
| | | | | 370/329 |
| 2023/0224916 | A1* | 7/2023 | Cirik ................... | H04W 74/08 |
| | | | | 370/329 |
| 2023/0254836 | A1* | 8/2023 | Jia ......................... | H04L 5/0044 |
| | | | | 370/329 |
| 2023/0362986 | A1* | 11/2023 | Leng ................ | H04W 74/0838 |
| 2023/0363005 | A1* | 11/2023 | Cirik ................... | H04W 52/50 |
| 2023/0371109 | A1* | 11/2023 | Jang .................... | H04B 17/328 |
| 2023/0403538 | A1* | 12/2023 | Shrestha ............ | H04B 7/18513 |
| 2023/0413139 | A1* | 12/2023 | Xu ...................... | H04W 74/006 |
| 2023/0413281 | A1* | 12/2023 | Park ..................... | H04L 5/0094 |
| 2024/0057192 | A1* | 2/2024 | Christoffersson ..... | H04W 76/19 |
| 2024/0171260 | A1* | 5/2024 | Milne ................... | H04W 60/00 |
| 2024/0259974 | A1* | 8/2024 | Shahmohammadian .................... | |
| | | | | H04B 7/024 |
| 2025/0142629 | A1* | 5/2025 | Rastegardoost ...... | H04L 5/0048 |

* cited by examiner

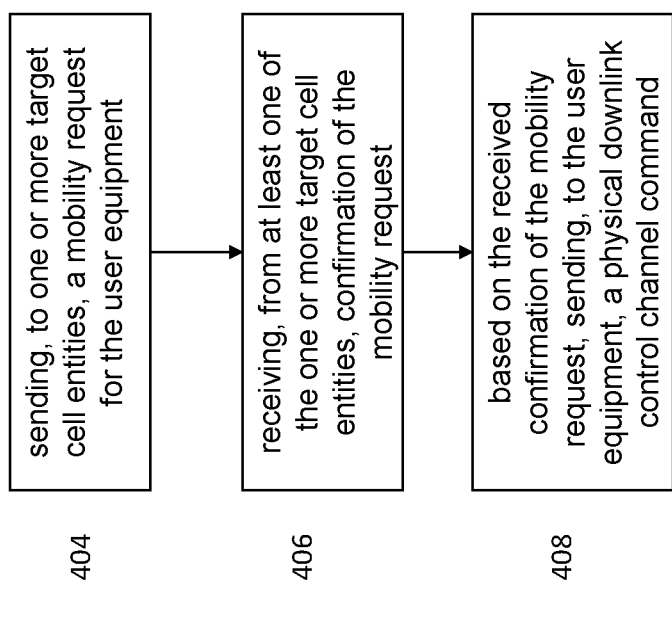

404    sending, to one or more target cell entities, a mobility request for the user equipment 406    receiving, from at least one of the one or more target cell entities, confirmation of the mobility request 408    based on the received confirmation of the mobility request, sending, to the user equipment, a physical downlink control channel command

Fig. 4b

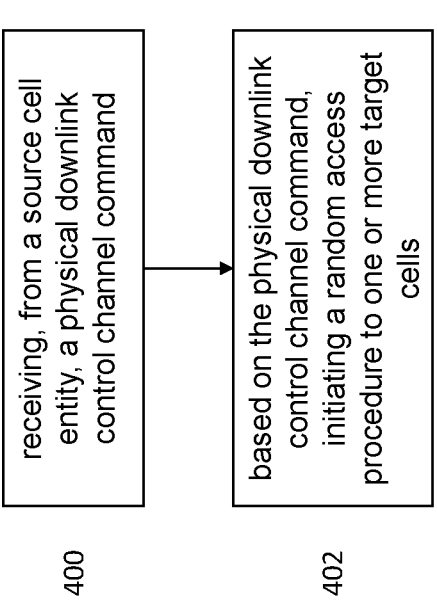

400    receiving, from a source cell entity, a physical downlink control channel command 402    based on the physical downlink control channel command, initiating a random access procedure to one or more target cells

Fig. 4a

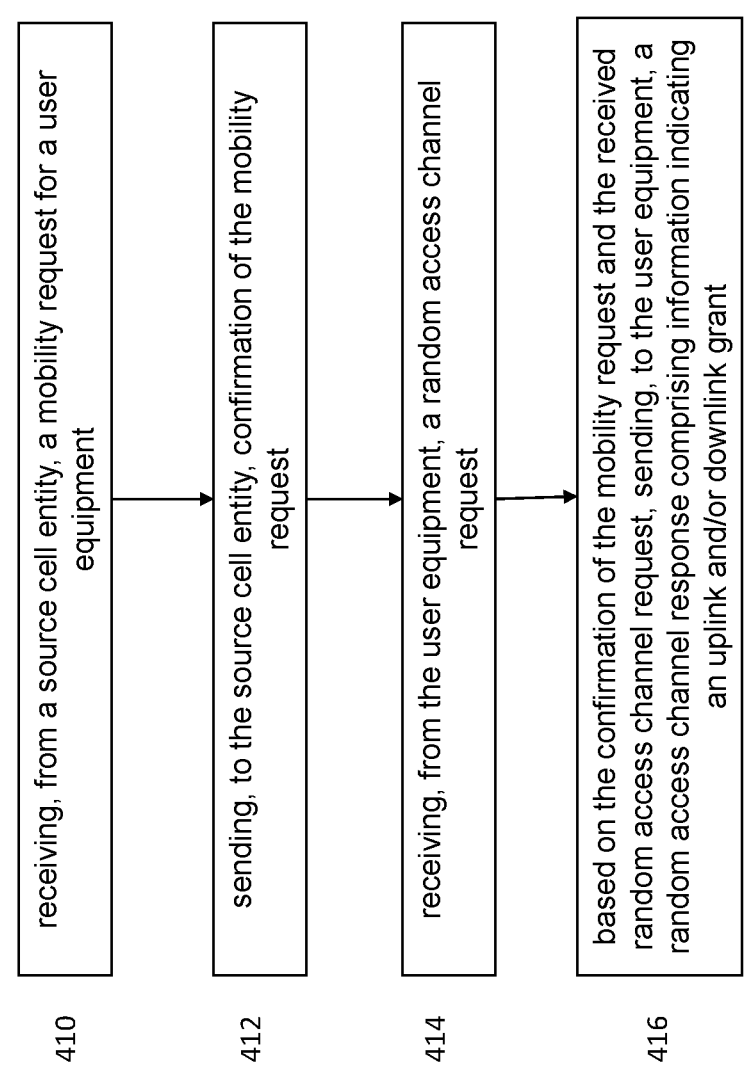

410 receiving, from a source cell entity, a mobility request for a user equipment 412 sending, to the source cell entity, confirmation of the mobility request 414 receiving, from the user equipment, a random access channel request 416 based on the confirmation of the mobility request and the received random access channel request, sending, to the user equipment, a random access channel response comprising information indicating an uplink and/or downlink grant

Fig. 4c

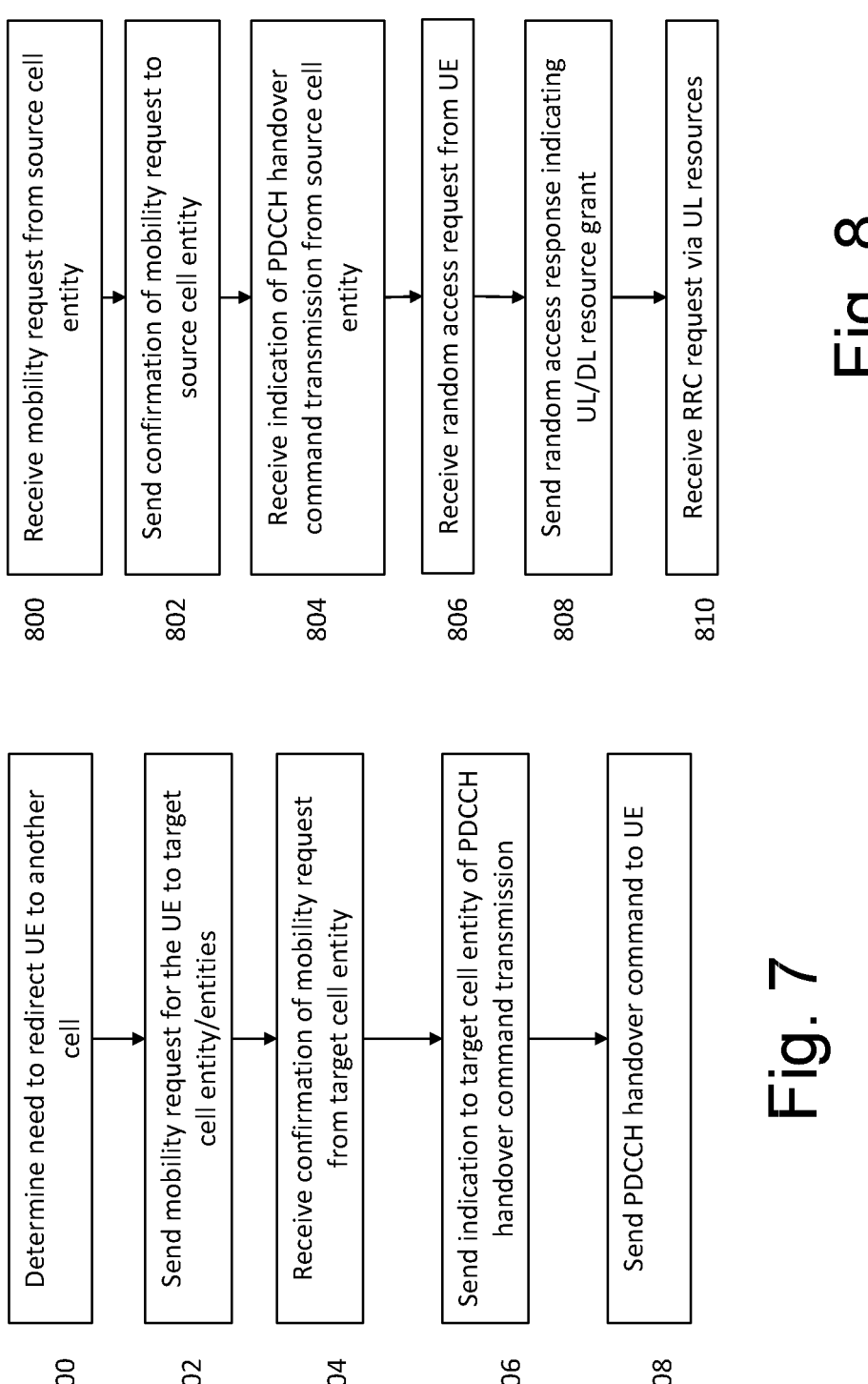

800 Receive mobility request from source cell entity

802 Send confirmation of mobility request to source cell entity

804 Receive indication of PDCCH handover command transmission from source cell entity 806 Receive random access request from UE 808 Send random access response indicating UL/DL resource grant 810 Receive RRC request via UL resources

Fig. 8

700 Determine need to redirect UE to another cell

702 Send mobility request for the UE to target cell entity/entities

704 Receive confirmation of mobility request from target cell entity

706 Send indication to target cell entity of PDCCH handover command transmission 708 Send PDCCH handover command to UE

Fig. 7

METHOD, APPARATUS AND COMPUTER PROGRAM

RELATED APPLICATION

This application is a continuation of U.S. patent application Ser. No. 18/172,888, filed Feb. 22, 2023, which is hereby incorporated by reference in its entirety.

FIELD

The present application relates to a method, apparatus, system and computer program and in particular but not exclusively to causing a user equipment to initiate a random access procedure.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided a user equipment comprising means for: receiving, from a source cell entity, a physical downlink control channel command; and based on the physical downlink control channel command, initiating a random access procedure to one or more target cells.

The physical downlink control channel command may comprise integrity information, and the means may be further configured for performing an integrity check of the command based on the integrity information and initiating the random access procedure based on a result of the integrity check.

The means may be further configured for: sending, to a target cell entity providing at least one of the one or more target cells, a random access channel request; and receiving, from the target cell entity, a random access channel response comprising information indicating an uplink and/or downlink resource grant.

The physical downlink control channel command may comprise a first dedicated preamble identifier, and wherein the random access channel request may comprise a first dedicated preamble corresponding to the first dedicated preamble identifier.

The means may be further configured for: sending a radio resource control request to the target cell entity based on the indicated uplink resource grant.

The radio resource control request may comprise one of: a re-establishment request; a resume request; a handover request; and a redirection request.

The physical downlink control channel command may comprise an indication that the user equipment is to perform contention based random access to the one or more target cells, and wherein initiating the random access procedure may comprise performing contention based random access.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The physical downlink control channel command may comprise information identifying a plurality of target cells.

The means may be further configured for selecting the one or more target cells from the plurality of target cells in response to receiving the physical downlink control channel command.

The means may be further configured for performing a cell selection procedure to determine the one or more target cells.

According to an aspect, there is provided a source cell entity comprising means for: sending, to one or more target cell entities, a mobility request for the user equipment; receiving, from at least one of the one or more target cell entities, confirmation of the mobility request; and based on the received confirmation of the mobility request, sending, to the user equipment, a physical downlink control channel command.

The mobility request may comprise user equipment context information, and wherein the confirmation of the mobility request may comprise confirmation of user equipment context transfer including dedicated preamble identifier for use in the physical downlink control channel command, and wherein the physical downlink control channel command may comprise the dedicated preamble identifier.

The confirmation of the mobility request may comprise a first dedicated preamble for use in the physical downlink control channel command and a second dedicated preamble for use in a physical downlink shared channel command.

The means may be further configured for: determining to use the first dedicated preamble based on one or more requirements associated with the user equipment; and in response to determining to use the first dedicated preamble, sending, to the user equipment, the physical downlink control channel command.

The one or more requirements associated with the user equipment may comprise at least one quality of service requirement and/or at least one quality of experience requirement.

The physical downlink control channel command may comprise integrity information.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The means may be further configured for sending, to the at least one of the one or more target cell entities, information indicating that the physical downlink control channel command has been sent to the user equipment.

According to an aspect, there is provided a target cell entity comprising means for: receiving, from a source cell entity, a mobility request for a user equipment; sending, to the source cell entity, confirmation of the mobility request; receiving, from the user equipment, a random access channel request; and based on the confirmation of the mobility request and the received random access channel request, sending, to the user equipment, a random access channel response comprising information indicating an uplink and/or downlink grant.

The confirmation of the mobility request may comprise a first dedicated preamble for use in a physical downlink control channel command and a second dedicated preamble for use in a physical downlink shared channel command.

The means may be further configured for: receiving, from the user equipment, a random access channel request; and sending, to the user equipment, a random access channel response comprising information indicating an uplink and/or downlink resource grant.

The confirmation of the mobility request may comprise a first dedicated preamble identifier, and wherein the random access channel request may comprise a first dedicated preamble corresponding to the first dedicated preamble identifier.

The means may be further configured for: receiving a radio resource control request based on the indicated uplink resource grant.

The means may be further configured for performing a radio resource control procedure based on the radio resource control request, wherein: the radio resource control request may comprise a re-establishment request and the radio resource control procedure may comprise a re-establishment procedure; or the radio resource control request may comprise a handover request and the radio resource control procedure may comprise a handover procedure; or the radio resource control request may comprise a redirection request and the radio resource control procedure may comprise a redirection procedure; or the radio resource control request may comprise a resume request and the radio resource control procedure may comprise a resume procedure.

The means may be further configured for associating the user equipment from which the random access channel request is received and the user equipment for which the mobility request was received based on the first dedicated preamble.

The mobility request may comprise user equipment context information, and wherein the confirmation of the mobility request may comprise confirmation of user equipment context transfer based on the user equipment context information.

The means may be further configured for receiving, from the source cell entity, information indicating that the physical downlink control channel command has been sent to the user equipment.

According to an aspect, there is provided a user equipment comprising at least one processor and at least one memory storing instructions that, when executed by the at least one processor, cause the user equipment at least to: receive, from a source cell entity, a physical downlink control channel command; and based on the physical downlink control channel command, initiate a random access procedure to one or more target cells.

The physical downlink control channel command may comprise integrity information, and the at least one processor may be further configured to cause the user equipment to perform an integrity check of the command based on the integrity information and initiate the random access procedure based on a result of the integrity check.

The at least one processor may be further configured to cause the user equipment to: send, to a target cell entity providing at least one of the one or more target cells, a random access channel request; and receive, from the target cell entity, a random access channel response comprising information indicating an uplink and/or downlink resource grant.

The physical downlink control channel command may comprise a first dedicated preamble identifier, and wherein the random access channel request may comprise a first dedicated preamble corresponding to the first dedicated preamble identifier.

The at least one processor may be further configured to cause the user equipment to: send a radio resource control request to the target cell entity based on the indicated uplink resource grant.

The radio resource control request may comprise one of: a re-establishment request; a resume request; a handover request; and a redirection request.

The physical downlink control channel command may comprise an indication that the user equipment is to perform contention based random access to the one or more target cells, and wherein initiating the random access procedure may comprise performing contention based random access.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The physical downlink control channel command may comprise information identifying a plurality of target cells.

The at least one processor may be further configured to cause the user equipment to select the one or more target cells from the plurality of target cells in response to receiving the physical downlink control channel command.

The at least one processor may be further configured to cause the user equipment to perform a cell selection procedure to determine the one or more target cells.

According to an aspect, there is provided a source cell entity comprising at least one processor and at least one memory storing instructions that, when executed by the at least one processor, cause the source cell entity at least to: send, to one or more target cell entities, a mobility request for the user equipment; receive, from at least one of the one or more target cell entities, confirmation of the mobility request; and based on the received confirmation of the mobility request, send, to the user equipment, a physical downlink control channel command.

The mobility request may comprise user equipment context information, and wherein the confirmation of the mobility request may comprise confirmation of user equipment context transfer including dedicated preamble identifier for use in the physical downlink control channel command, and wherein the physical downlink control channel command may comprise the dedicated preamble identifier.

The confirmation of the mobility request may comprise a first dedicated preamble for use in the physical downlink control channel command and a second dedicated preamble for use in a physical downlink shared channel command.

The at least one processor may be further configured to cause the source cell entity to: determine to use the first dedicated preamble based on one or more requirements associated with the user equipment; and in response to determining to use the first dedicated preamble, send, to the user equipment, the physical downlink control channel command.

The one or more requirements associated with the user equipment may comprise at least one quality of service requirement and/or at least one quality of experience requirement.

The physical downlink control channel command may comprise integrity information.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The at least one processor may be further configured to cause the source cell entity to send, to the at least one of the one or more target cell entities, information indicating that the physical downlink control channel command has been sent to the user equipment.

According to an aspect, there is provided a target cell entity comprising at least one processor and at least one memory storing instructions that, when executed by the at least one processor, cause the target cell entity at least to: receive, from a source cell entity, a mobility request for a user equipment; send, to the source cell entity, confirmation of the mobility request; receive, from the user equipment, a random access channel request; and based on the confirmation of the mobility request and the received random access channel request, send, to the user equipment, a random access channel response comprising information indicating an uplink and/or downlink grant.

The confirmation of the mobility request may comprise a first dedicated preamble for use in a physical downlink control channel command and a second dedicated preamble for use in a physical downlink shared channel command.

The at least one processor may be further configured to cause the target cell entity to: receive, from the user equipment, a random access channel request; and send, to the user equipment, a random access channel response comprising information indicating an uplink and/or downlink resource grant.

The confirmation of the mobility request may comprise a first dedicated preamble identifier, and wherein the random access channel request may comprise a first dedicated preamble corresponding to the first dedicated preamble identifier.

The at least one processor may be further configured to cause the target cell entity to: receive a radio resource control request based on the indicated uplink resource grant.

The at least one processor may be further configured to cause the target cell entity to perform a radio resource control procedure based on the radio resource control request, wherein: the radio resource control request may comprise a re-establishment request and the radio resource control procedure may comprise a re-establishment procedure; or the radio resource control request may comprise a handover request and the radio resource control procedure may comprise a handover procedure; or the radio resource control request may comprise a redirection request and the radio resource control procedure may comprise a redirection procedure; or the radio resource control request may comprise a resume request and the radio resource control procedure may comprise a resume procedure.

The at least one processor may be further configured to cause the target cell to associate the user equipment from which the random access channel request is received and the user equipment for which the mobility request was received based on the first dedicated preamble.

The mobility request may comprise user equipment context information, and wherein the confirmation of the mobility request may comprise confirmation of user equipment context transfer based on the user equipment context information.

The at least one processor may be further configured to cause the target cell entity to receive, from the source cell entity, information indicating that the physical downlink control channel command has been sent to the user equipment.

According to an aspect, there is provided a method performed at a user equipment, the method comprising: receiving, from a source cell entity, a physical downlink control channel command; and based on the physical downlink control channel command, initiating a random access procedure to one or more target cells.

The physical downlink control channel command may comprise integrity information, and the method may comprise performing an integrity check of the command based on the integrity information and initiating the random access procedure based on a result of the integrity check.

The method may comprise: sending, to a target cell entity providing at least one of the one or more target cells, a random access channel request; and receiving, from the target cell entity, a random access channel response comprising information indicating an uplink and/or downlink resource grant.

The physical downlink control channel command may comprise a first dedicated preamble identifier, and wherein the random access channel request may comprise a first dedicated preamble corresponding to the first dedicated preamble identifier.

The method may comprise: sending a radio resource control request to the target cell entity based on the indicated uplink resource grant.

The radio resource control request may comprise one of: a re-establishment request; a resume request; a handover request; and a redirection request.

The physical downlink control channel command may comprise an indication that the user equipment is to perform contention based random access to the one or more target cells, and wherein initiating the random access procedure may comprise performing contention based random access.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The physical downlink control channel command may comprise information identifying a plurality of target cells.

The method may comprise selecting the one or more target cells from the plurality of target cells in response to receiving the physical downlink control channel command.

The method may comprise performing a cell selection procedure to determine the one or more target cells.

According to an aspect, there is provided a method performed at a source cell entity, the method comprising: sending, to one or more target cell entities, a mobility request for the user equipment; receiving, from at least one of the one or more target cell entities, confirmation of the mobility request; and based on the received confirmation of the mobility request, sending, to the user equipment, a physical downlink control channel command.

The mobility request may comprise user equipment context information, and wherein the confirmation of the mobility request may comprise confirmation of user equipment context transfer including dedicated preamble identifier for use in the physical downlink control channel command, and wherein the physical downlink control channel command may comprise the dedicated preamble identifier.

The confirmation of the mobility request may comprise a first dedicated preamble for use in the physical downlink control channel command and a second dedicated preamble for use in a physical downlink shared channel command.

The method may comprise: determining to use the first dedicated preamble based on one or more requirements associated with the user equipment; and in response to determining to use the first dedicated preamble, sending, to the user equipment, the physical downlink control channel command.

The one or more requirements associated with the user equipment may comprise at least one quality of service requirement and/or at least one quality of experience requirement.

The physical downlink control channel command may comprise integrity information.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The method may comprise sending, to the at least one of the one or more target cell entities, information indicating that the physical downlink control channel command has been sent to the user equipment.

According to an aspect, there is provided a method performed at a target cell entity, the method comprising: receiving, from a source cell entity, a mobility request for a user equipment; sending, to the source cell entity, confirmation of the mobility request; receiving, from the user equipment, a random access channel request; and based on the confirmation of the mobility request and the received random access channel request, sending, to the user equipment, a random access channel response comprising information indicating an uplink and/or downlink grant.

The confirmation of the mobility request may comprise a first dedicated preamble for use in a physical downlink control channel command and a second dedicated preamble for use in a physical downlink shared channel command.

The method may comprise: receiving, from the user equipment, a random access channel request; and sending, to the user equipment, a random access channel response comprising information indicating an uplink and/or downlink resource grant.

The confirmation of the mobility request may comprise a first dedicated preamble identifier, and wherein the random access channel request may comprise a first dedicated preamble corresponding to the first dedicated preamble identifier.

The method may comprise: receiving a radio resource control request based on the indicated uplink resource grant.

The method may comprise performing a radio resource control procedure based on the radio resource control request, wherein: the radio resource control request may comprise a re-establishment request and the radio resource control procedure may comprise a re-establishment procedure; or the radio resource control request may comprise a handover request and the radio resource control procedure may comprise a handover procedure; or the radio resource control request may comprise a redirection request and the radio resource control procedure may comprise a redirection procedure; or the radio resource control request may comprise a resume request and the radio resource control procedure may comprise a resume procedure.

The method may comprise associating the user equipment from which the random access channel request is received and the user equipment for which the mobility request was received based on the first dedicated preamble.

The mobility request may comprise user equipment context information, and wherein the confirmation of the mobility request may comprise confirmation of user equipment context transfer based on the user equipment context information.

The method may comprise receiving, from the source cell entity, information indicating that the physical downlink control channel command has been sent to the user equipment.

According to an aspect, there is provided a computer readable medium comprising instructions which, when executed by a user equipment, cause the user equipment to perform at least the following: receiving, from a source cell entity, a physical downlink control channel command; and based on the physical downlink control channel command, initiating a random access procedure to one or more target cells.

The physical downlink control channel command may comprise integrity information, and the instructions, when executed by the user equipment, may cause the user equipment to further perform an integrity check of the command based on the integrity information and initiating the random access procedure based on a result of the integrity check.

The instructions, when executed by the user equipment, may cause the user equipment to further perform: sending, to a target cell entity providing at least one of the one or more target cells, a random access channel request; and receiving, from the target cell entity, a random access channel response comprising information indicating an uplink and/or downlink resource grant.

The physical downlink control channel command may comprise a first dedicated preamble identifier, and wherein the random access channel request may comprise a first dedicated preamble corresponding to the first dedicated preamble identifier.

The instructions, when executed by the user equipment, may cause the user equipment to further perform: sending a radio resource control request to the target cell entity based on the indicated uplink resource grant.

The radio resource control request may comprise one of: a re-establishment request; a resume request; a handover request; and a redirection request.

The physical downlink control channel command may comprise an indication that the user equipment is to perform contention based random access to the one or more target cells, and wherein initiating the random access procedure may comprise performing contention based random access.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The physical downlink control channel command may comprise information identifying a plurality of target cells.

The instructions, when executed by the user equipment, may cause the user equipment to further perform selecting the one or more target cells from the plurality of target cells in response to receiving the physical downlink control channel command.

The instructions, when executed by the user equipment, may cause the user equipment to further perform a cell selection procedure to determine the one or more target cells.

According to an aspect, there is provided a computer readable medium comprising instructions which, when executed by a source cell entity, cause the source cell entity to perform at least the following: sending, to one or more target cell entities, a mobility request for the user equipment; receiving, from at least one of the one or more target cell entities, confirmation of the mobility request; and based on the received confirmation of the mobility request, sending, to the user equipment, a physical downlink control channel command.

The mobility request may comprise user equipment context information, and wherein the confirmation of the mobility request may comprise confirmation of user equipment context transfer including dedicated preamble identifier for use in the physical downlink control channel command, and wherein the physical downlink control channel command may comprise the dedicated preamble identifier.

The confirmation of the mobility request may comprise a first dedicated preamble for use in the physical downlink control channel command and a second dedicated preamble for use in a physical downlink shared channel command.

The instructions, when executed by the source cell entity, may cause the source cell entity to further perform: determining to use the first dedicated preamble based on one or more requirements associated with the user equipment; and in response to determining to use the first dedicated preamble, sending, to the user equipment, the physical downlink control channel command.

The one or more requirements associated with the user equipment may comprise at least one quality of service requirement and/or at least one quality of experience requirement.

The physical downlink control channel command may comprise integrity information.

The physical downlink control channel command may comprise target cell information.

The target cell information may comprise one or more of: target cell identity information; target cell frequency information; an absolute radio frequency channel number of the target cell; an absolute frequency point A of the target cell; and/or an absolute frequency of synchronization signal block of the target cell.

The instructions, when executed by the source cell entity, may cause the source cell entity to further perform sending, to the at least one of the one or more target cell entities, information indicating that the physical downlink control channel command has been sent to the user equipment.

According to an aspect, there is provided a computer readable medium comprising instructions which, when executed by a target cell entity, cause the target cell entity to perform at least the following: receiving, from a source cell entity, a mobility request for a user equipment; sending, to the source cell entity, confirmation of the mobility request; receiving, from the user equipment, a random access channel request; and based on the confirmation of the mobility request and the received random access channel request, sending, to the user equipment, a random access channel response comprising information indicating an uplink and/or downlink grant.

The confirmation of the mobility request may comprise a first dedicated preamble for use in a physical downlink control channel command and a second dedicated preamble for use in a physical downlink shared channel command.

The instructions, when executed by the target cell entity, may cause the target cell entity to further perform: receiving, from the user equipment, a random access channel request; and sending, to the user equipment, a random access channel response comprising information indicating an uplink and/or downlink resource grant.

The confirmation of the mobility request may comprise a first dedicated preamble identifier, and wherein the random access channel request may comprise a first dedicated preamble corresponding to the first dedicated preamble identifier.

The instructions, when executed by the target cell entity, may cause the target cell entity to further perform: receiving a radio resource control request based on the indicated uplink resource grant.

The instructions, when executed by the target cell entity, may cause the target cell entity to further perform a radio resource control procedure based on the radio resource control request, wherein: the radio resource control request may comprise a re-establishment request and the radio resource control procedure may comprise a re-establishment procedure; or the radio resource control request may comprise a handover request and the radio resource control procedure may comprise a handover procedure; or the radio resource control request may comprise a redirection request and the radio resource control procedure may comprise a redirection procedure; or the radio resource control request may comprise a resume request and the radio resource control procedure may comprise a resume procedure.

The instructions, when executed by the target cell entity, may cause the target cell entity to further perform associating the user equipment from which the random access channel request is received and the user equipment for which the mobility request was received based on the first dedicated preamble.

The mobility request may comprise user equipment context information, and wherein the confirmation of the mobility request may comprise confirmation of user equipment context transfer based on the user equipment context information.

The instructions, when executed by the target cell entity, may cause the target cell entity to further perform receiving, from the source cell entity, information indicating that the physical downlink control channel command has been sent to the user equipment.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIGS. 4*a*, 4*b* and 4*c* show methods according to some examples;

FIG. 7 shows a method performed by a source cell entity according to some examples; and FIG. 8 shows a method performed by a target cell entity according to some examples.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
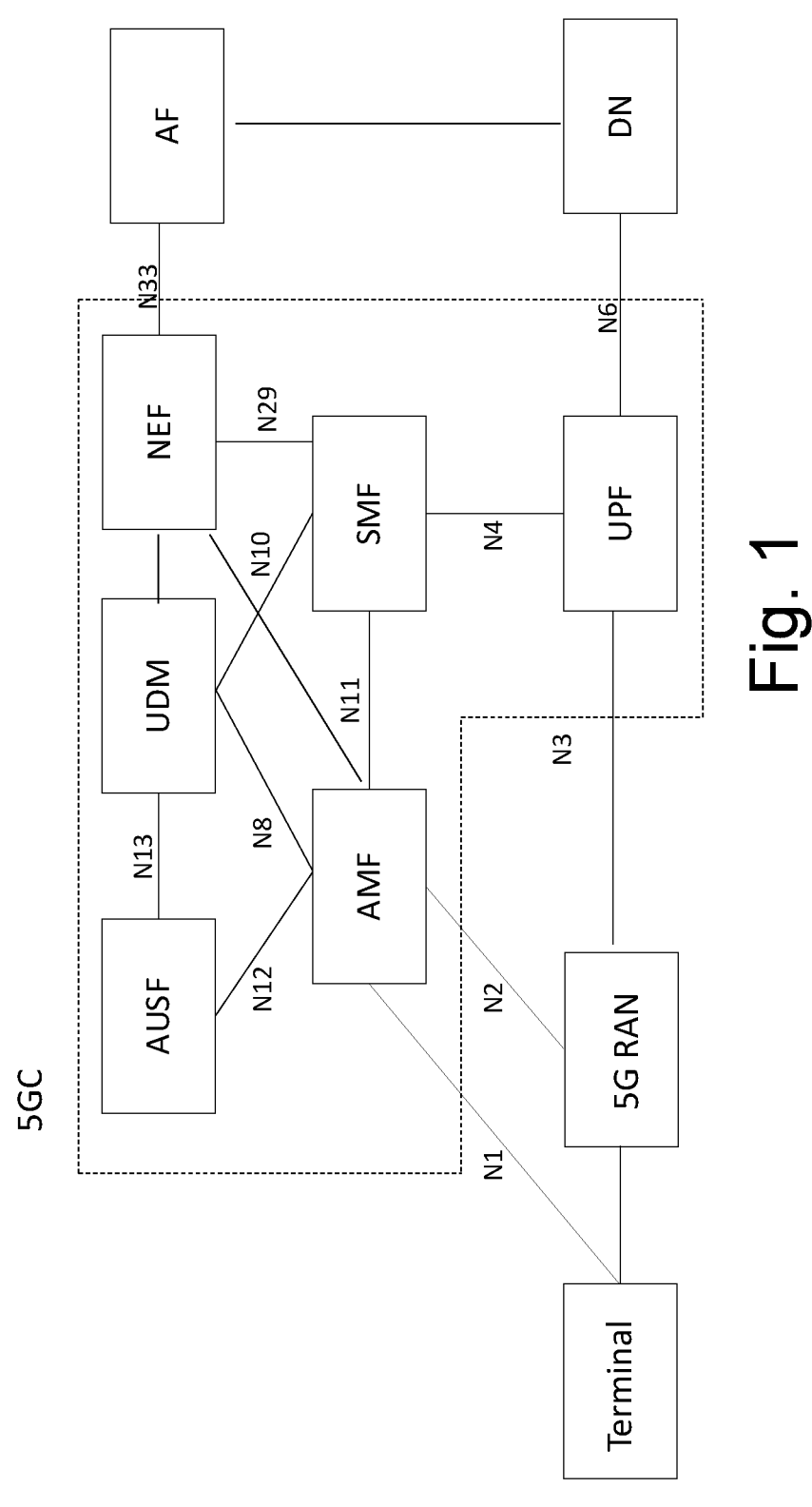
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF). FIG. 1 also shows the various interfaces (N1, N2 etc.) that may be implemented between the various elements of the system.

Figure 2:
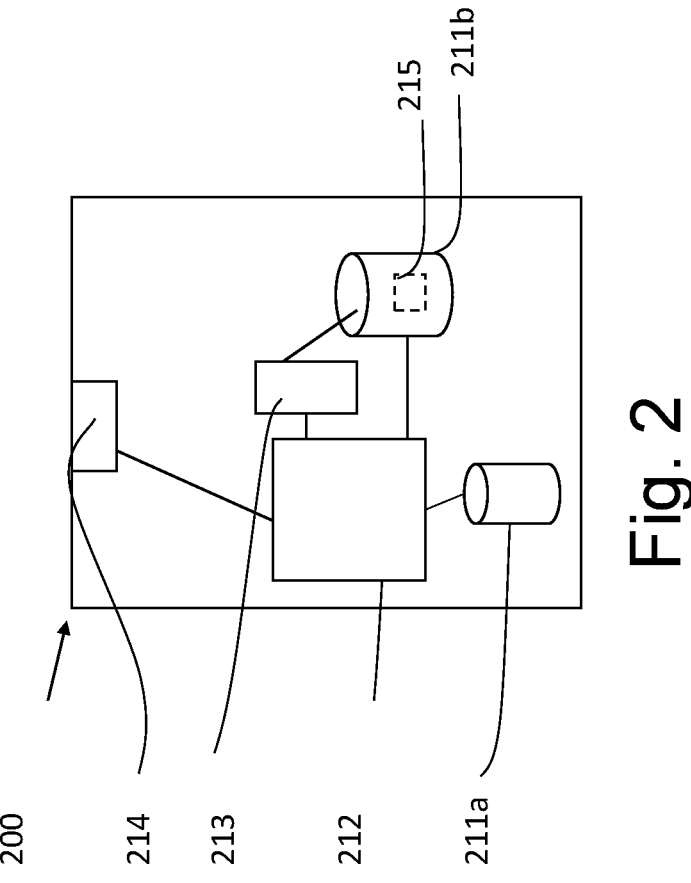
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
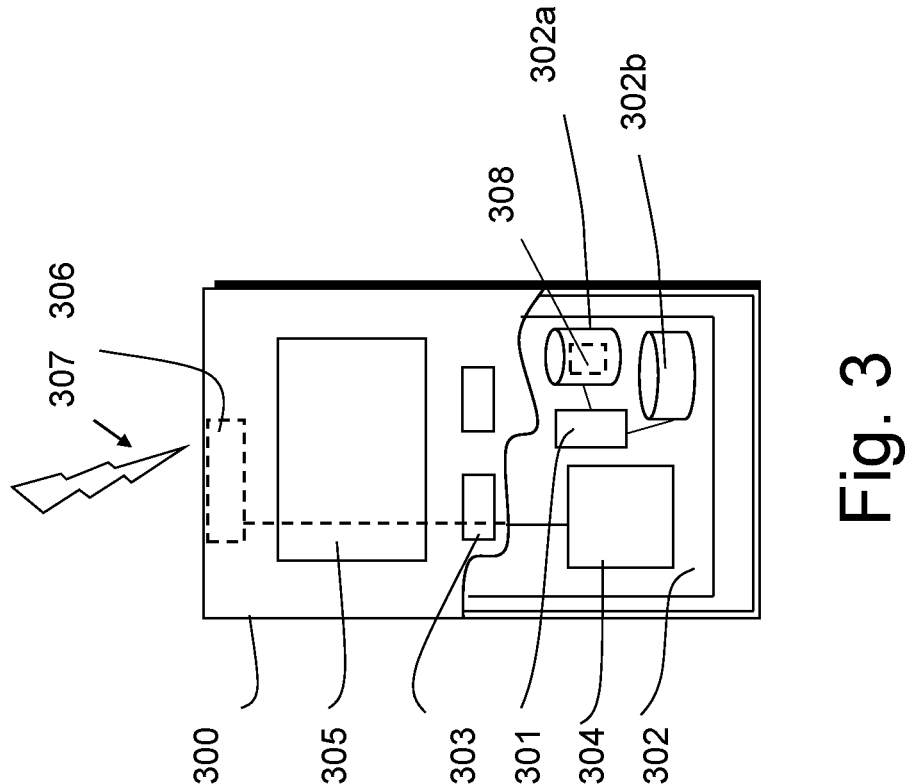
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

One feature of wireless networks is the support of UE mobility, which can be supported via many different methods stemming from simple cell redirections in which control plane (C-plane) and user plane (U-plane) have to be re-established every time the cell changes, to cell free mobility, where cell changes strive to be practically transparent to the end user device to the common handover procedures.

Some developments around the topic of mobility include reducing the interruption times (C-plane and U-plane) and increasing robustness to better support new use cases such as Ultra Reliable Low Latency Communication (URLLC) or Extended Reailty (XR)/Virtual Reality (VR), and legacy use cases such as Voice over NR (VoNR) or video calls.

In wireless networks every handover can potentially lead to a dropped connection for the UE and may also have some repercussions on end user experience from the interruptions in C-plane and/or U-plane. A common strategy is to optimize networks to minimize the number of handovers to improve the end user experience. However, there may be scenarios that are difficult to optimize, and which may result in unneeded handovers (e.g. so called "ping pong" handovers) or handovers being too late or too early.

After a serving cell has decided to execute a handover, it may send a handover command to the UE (e.g., RRC Reconfiguration with sync in NR). In order for the UE to be able to initiate the handover execution, the UE may first need to receive the Physical Downlink Control Channel (PDCCH) and Physical Downlink Shared Channel (PDSCH) (scheduled by PDCCH) transmissions in which a HO command is encapsulated.

In some scenarios the UE may not be able to properly decode the PDSCH with the HO command. For example, sudden changes in radio conditions whilst the UE is attempting to receive/decode the PDCCH scheduling command. This may eventually lead the UE to a radio link failure for the serving cell, and then to initiating a cell selection procedure followed by an RRC re-establishment procedure. The interruption time in these scenarios may impact end user experience.

Some examples may seek to improve the robustness of the handover procedure and minimize interruptions for the end user. Some examples may utilize a PDCCH Order and Layer 1 signalling to initiate handover.

The PDCCH order functionality may be employed by a serving cell to request a UE to initiate a random-access procedure using a dedicated preamble. This procedure may be employed when the serving cell detects that UE is out of synchronization from an UL timing point of view. The PDCCH order may cause a UE to re-synchronize to the cell it received the PDCCH order from.

Reference is made to FIGS. 4a, 4b and 4c, which show methods according to some examples.

FIG. 4a shows an example method that may be performed at a user equipment. At 400, the method comprises receiving, from a source cell entity, a physical downlink control channel command. At 402, the method comprises, based on the physical downlink control channel command, initiating a random access procedure to one or more target cells.

FIG. 4b shows an example method that may be performed at a source cell entity. At 404 the method comprises sending, to one or more target cell entities, a mobility request for the user equipment. At 406 the method comprises receiving, from at least one of the one or more target cell entities, confirmation of the mobility request. At 408 the method comprises, based on the received confirmation of the mobility request, sending, to the user equipment, a physical downlink control channel command.

FIG. 4c shows an example method that may be performed at a target cell entity. At 410, the method comprises receiving, from a source cell entity, a mobility request for a user equipment. At 412 the method comprises sending, to the source cell entity, confirmation of the mobility request. At 414 the method comprises receiving, from the user equipment, a random access channel request. At 416 the method comprises, based on the confirmation of the mobility request and the received random access channel request, sending, to the user equipment, a random access channel response comprising information indicating an uplink and/or downlink grant.

In some examples, the source cell entity may comprise an entity providing a source cell and the target cell entity may comprise an entity providing a target cell. The source cell entity may comprise an access node, such as but not limited to a gNB. The target cell entity may comprise an access node, such as but not limited to a gNB. The source cell entity and target cell entity may be the same entity (e.g. a same access node providing a source cell and a target cell), or may be different entities (e.g. a first access node providing a source cell and a second access node providing a target cell).

Some examples may utilize a command transmitted from source cell to UE via PDCCH (termed a PDCCH handover command herein) to trigger the UE to initiate a mobility procedure towards a target cell. The mobility procedure may for example comprise a re-establishment procedure, handover procedure, redirection procedure, and the like. Since the PDCCH channel typically has a better link budget and is more robust than the PDSCH, in some examples the robustness of the mobility procedure may be improved.

Figure 5:
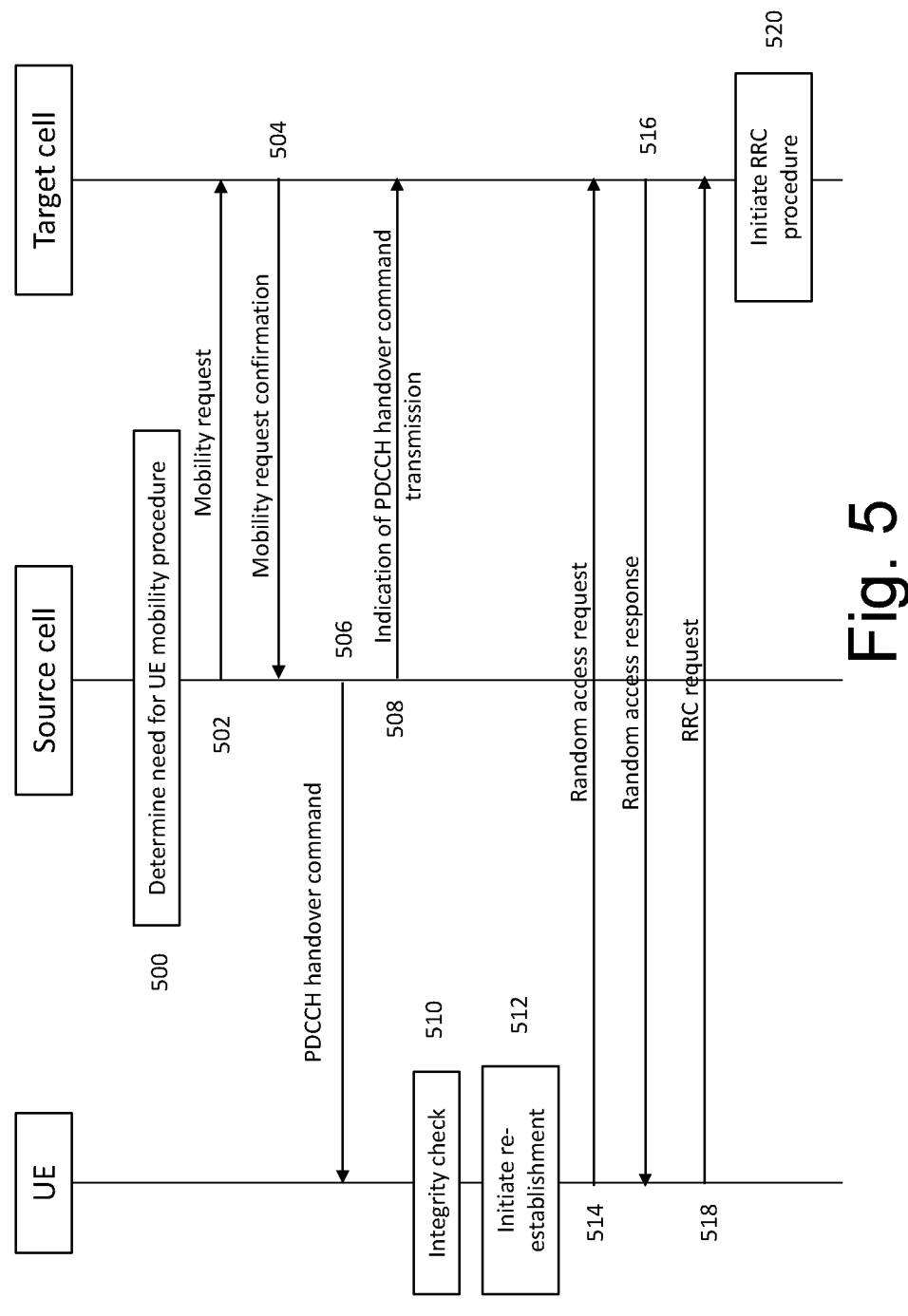
FIG. 5 shows a signalling exchange according to some examples.

Reference is made to FIG. 5, which shows a signalling exchange according to some examples.

At 500, the source cell entity may determine the need to trigger a mobility procedure for a UE. The source cell entity may perform this determination based on any suitable criteria, such as existing criteria for handover procedures. For example, the source cell entity may determine a high block error rate (BLER) associated with PDSCH transmission of a handover command, need to turn cell off, load balancing etc.

At 502, the source cell entity sends a mobility request for the UE to the target cell entity. The mobility request may comprise UE context information.

At 504, the target cell entity sends a confirmation of the mobility request received from the source cell entity at 502. The confirmation may for example comprise a confirmation of UE context transfer. In some examples, the target cell entity may provide a dedicated preamble ID for PDCCH based mobility procedure to the source cell along with a RRC HO command. The source cell entity may apply this preamble for PDCCH based mobility when mobility is triggered.

In some examples, the target cell entity may provide two dedicated preamble IDs. A first dedicated preamble ID may be for use in a PDCCH command, and a second dedicated preamble ID may be for use in a PDSCH command.

The source cell entity may thus obtain dedicated preamble ID(s) for the target cell entity, e.g. as per existing handover procedures.

At 506, the source cell entity sends a PDCCH command to the UE. The PDCCH command may comprise target cell information, such as one or more of: a cell id (e.g., Physical Cell Identity, PCI), frequency information, an absolute radio-frequency channel number value (ARFCN-ValueNR), absoluteFrequencyPointA, and/or absoluteFrequencySSB. The PDCCH command may be considered a command transmitted via PDCCH.

In some examples, the target cell may be known to the UE, e.g., through a previous measurement report sent by the UE. In such examples, the PDCCH command may comprise only the PCI, and the UE may assume the known target cell to be attempted by the indicated PCI.

In some examples, the PDCCH command may comprise be a PDCCH order, or other downlink control information defined for the purpose.

In some examples, a PDCCH command may indicate a dedicated PRACH preamble to be used by the UE to access the target cell or indicate that the UE is to use contention-based random access to access the target cell.

The PDCCH command may include integrity information, such as Medium Access Control (MAC) information (e.g. shortMAC-I) or any other bit string. The UE may use the integrity information to determine the access node transmitting the PDCCH command is genuine.

As mentioned previously, in some examples the source cell entity may receive two dedicated preamble IDs from the target cell entity. The source cell entity may determine to use the first dedicated preamble ID, and in response send the PDCCH command to the UE at 506. The source cell entity may determine to use the second dedicated preamble ID, and in response send a PDSCH command. The source cell entity may determine to use both the first and second dedicated preamble IDs and in response send a PDCCH command and PDSCH command to the UE. The PDCCH command may comprise a first dedicated preamble corresponding to the first dedicated preamble identifier. The PDSCH command may comprise a dedicated preamble corresponding to the second dedicated preamble ID. The first and second dedicated preambles may be different.

Optionally at 508, the source cell entity may send an indication of a PDCCH mobility procedure to the target cell entity (i.e. the source cell entity may indicate to the target cell entity that a PDCCH command has been sent to the UE). The indication may comprise the integrity information. It should be noted that step 508 may be performed during the initiation of the UE context transfer or after.

In some examples, step 508 could be combined in step 502, or step 508 may be independent as displayed in FIG. 5.

If step 508 is combined in step 502, then at 504 the target cell entity may provide the source cell two dedicated preamble Ids for the UE: one to be sent to the UE via the PDCCH command and another one to be sent to the UE if the source cell entity decides to trigger a PDSCH command for mobility. One drawback to this approach is that double the number of dedicated preambles may be consumed.

At 510, the UE confirms the integrity of the PDCCH command received at 506. For example, the UE may confirm the integrity of the PDCCH command based on the integrity information, such as the shortMAC-I.

At 512, when the integrity check of the PDCCH command is successful, the UE determines to initiate a random access procedure to the target cell based on the PDCCH command. Initiating a random access procedure may comprise sending, to the target cell entity, a random access channel request. The random access channel request may be or may comprise a dedicated preamble, e.g. PRACH preamble.

In some examples, based on the PDCCH command, the UE may determine to initiate a RRC procedure towards the target cell. The RRC procedure may for example be a RRC re-establishment procedure, handover procedure, or redirection procedure, such as but not limited to those described in existing standards. The UE may determine to initiate the random access procedure at 512 as part of the RRC procedure.

In some examples, the PDCCH command may explicitly indicate the target cell. In such examples, the UE may initiate a RRC procedure towards the indicated target cell without performing cell selection procedure.

In other examples, the PDCCH command may not indicate target cell ID, but may indicate the UE to perform a RRC procedure immediately without waiting for a radio link failure trigger (e.g. number of Qouts). In some examples, the UE may perform a cell selection procedure as part of the RRC procedure. That is to say, the UE may determine the target cell in response to receiving the PDCCH command, and subsequently perform a RRC procedure towards the selected target cell.

In some examples, instead of initiating a RRC procedure as per existing standards, the UE may initiate a further RRC procedure towards the indicated target cell. This further RRC procedure may be similar to existing RRC procedures, such as an RRC re-establishment procedure, but may be without the need for cell selection and with different RRC request message content.

In some examples, the UE RRC layer may initiate the RRC procedure. In some examples, the UE PHY/MAC layer may indicate to the RRC layer the receival of the PDCCH command, which may trigger the RRC procedure.

At 514, UE sends a random access channel request to the target cell entity. The random access channel request may comprise the dedicated preamble (the first dedicated preamble where two dedicated preambles are provided by the target cell at 504).

At 516, the target cell entity sends a random access channel response to the UE. The target cell entity may send the response based on the confirmation of the mobility request (sent at 504) and the received random access channel request. The response may comprise information indicating uplink and/or downlink resources for the UE to use—for example when sending a RRC request, e.g. RRC request for re-establishment.

At 518, the UE may send a RRC request to the target cell entity.

In some examples, the UE may transmit a RRC request, such as a RRCReestablishmentRequest, to the target cell entity with information encoded as per existing procedures (e.g., C-RNTI and PCI of target cell and shortMAC-I). In some examples, the UE may include information in the request indicating a cause for sending the RRC request (e.g. a re-establishment cause). The cause may be that the UE received the PDCCH command—for example "L1handoverCommand" or similar.

In some examples, the UE may transmit a RRCRequest to the target cell entity with information. The request may comprise a UE ID (e.g., C-RNTI) and further information (e.g. shortMAC-I) for integrity verification.

In some examples, the RRC request may comprise a handover request, resume request, re-establishment request, redirection request, or the like.

At 520, the target cell entity may initiate a RRC procedure based on the received request. For example, when the radio resource control request comprises a re-establishment request, the radio resource control procedure may comprise a re-establishment procedure; when the radio resource control request comprises a handover request, the radio resource control procedure may comprise a handover procedure; and when the radio resource control request comprises a redirection request, the radio resource control procedure may comprise a redirection procedure.

In some examples the target cell entity may identify the UE performing PDCCH based mobility based on the dedicated preamble Id it assigned for contention free RA procedure at step 504, or from the RRC Request message sent by the UE at 514.

In some examples, the target cell entity may provide a RRC message or a to reconfigure the UE, since the target cell has the UE context information already from step 502.

Figure 6:
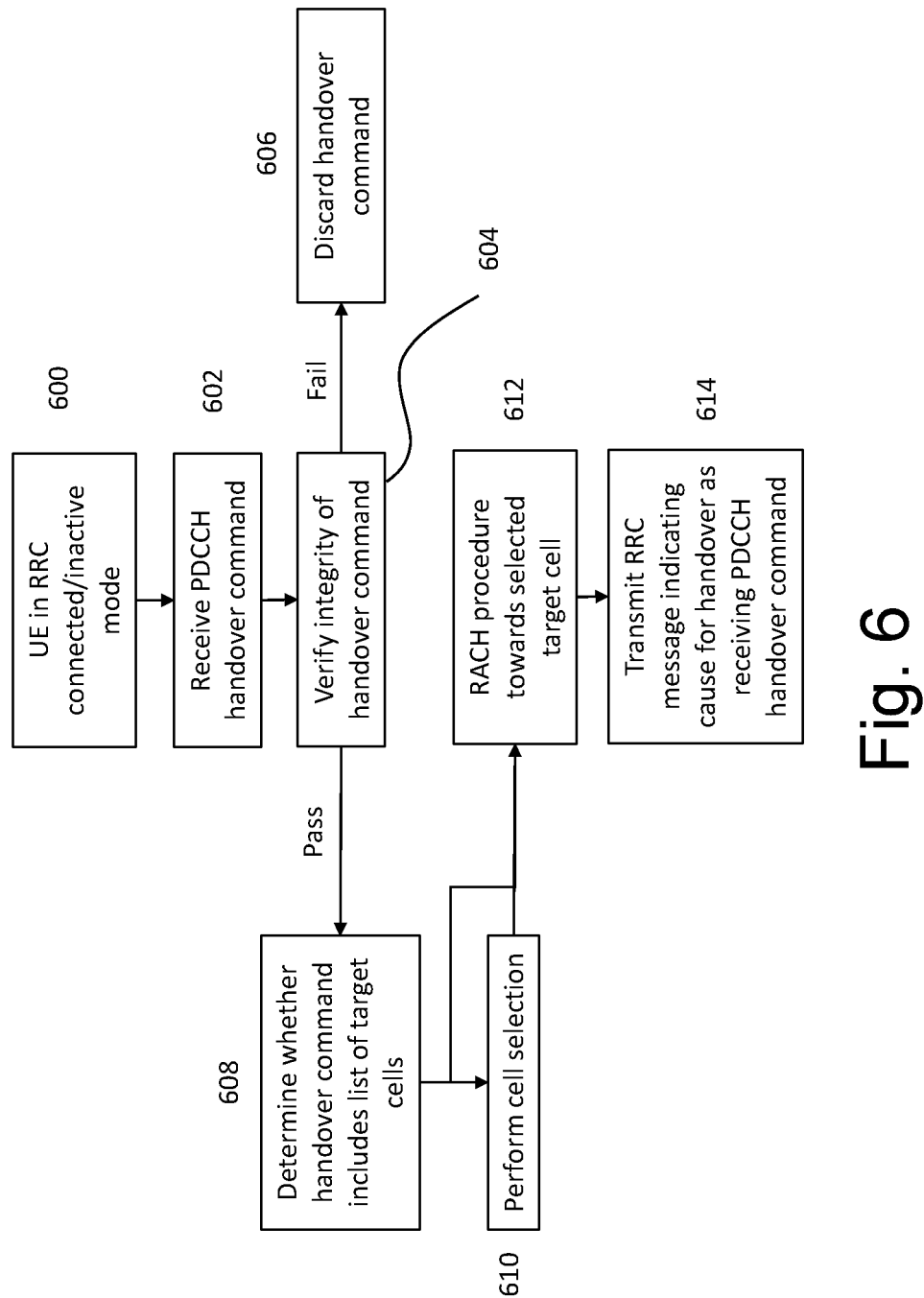
FIG. 6 shows a method performed by a user equipment according to some examples.

Reference is made to FIG. 6, which shows a method performed by a UE according to some examples.

At 600, the UE is in an RRC connected or RRC inactive mode.

At 602, the UE receives a PDCCH command from a source cell entity. The PDCCH command may be as described previously.

At 604, the UE may verify the integrity of the PDCCH command, for example as described previously.

When the integrity check at 604 fails, at 606 the UE may discard the PDCCH command.

When the integrity check at 604 is passed, at 608 the UE may determine whether the PDCCH command includes a list of target cells.

When the UE determines that the PDCCH command does not include a list of target cells, at 610 the UE may initiate a cell selection procedure to select a target cell. For example, the UE may perform measurements to detect one or more target cell candidates and select from the candidates a target cell to perform a mobility operation towards.

When the UE determines that the PDCCH command includes a list of target cells, the UE may bypass step 610 and select a target cell comprised in the list of target cells and initiates RACH procedure towards the selected target cell.

At 612, the UE initiates a random access procedure to the selected target cell. For example, the UE may sends a random access request to the target cell entity providing the selected target cell (herein the selected target cell entity), and may receive a random access response from the selected target cell entity. The random access request may comprise a dedicated preamble if one is provided in the PDCCH command. The random access response may comprise uplink and/or downlink grant information from the selected target cell entity.

At 614, after receiving a random access response, the UE may transmit a RRC request to the selected target cell entity. The RRC request may comprise an indication that the cause for the UE sending the request was the UE receiving the PDCCH command, and/or information identifying the UE.

Reference is made to FIGS. 7 and 8, which respectively show methods performed by a source cell entity and target cell entity according to some examples.

At 700, the source cell entity may determine the need to redirect the UE to another cell. The determination may be based on any suitable criteria, such as existing handover criteria.

At 702 the source cell entity sends, to one or more target cell entities, a mobility request for the UE. The mobility request may for example comprise UE context information.

At 704, the source cell entity receives confirmation of the mobility request from the one or more target cells. The confirmation may comprise a dedicated preamble ID. In some examples, the source cell entity may receive a first dedicated preamble ID for use in a physical downlink control channel command and a second dedicated preamble for use in a physical downlink shared channel command.

At 706, the source cell entity may send an indication of transmission of a PDCCH command to the target cell entity/entities.

At 708, the source cell entity sends a PDCCH command to the UE, as described previously. The PDCCH command may comprise information indicating the integrity of the PDCCH command.

Steps 706 and 708 may be performed simultaneously, at substantially the same time, or in a different order to that shown in FIG. 7 (i.e. step 708 may be executed before, at substantially the same time as, or after step 706).

At 800, the target cell entity (being one of the one or more target cell entities to which the source cell entity sends a mobility request at 702) receives the mobility request. The mobility request may comprise UE context information as described previously.

At 802, the target cell entity sends, to the source cell, confirmation of the mobility request. The confirmation of the mobility request may comprise a dedicated preamble ID for UE handover as described previously.

At 804, the target cell entity may receive information indicating that the source cell entity has initiated a PDCCH command based mobility procedure for the UE. The information may for example comprise the indication sent by the source cell entity at 706, or may comprise information included in a message received from the UE during connection establishment with the target cell entity (e.g. random access request message).

At 806, the target cell entity receives, from the UE, a random access request. The request may comprise a dedicated preamble corresponding to the dedicated preamble ID provided to the UE at 802.

At 808, the target cell entity transmits a random access response to the UE including an indication of an uplink and/or downlink grant. The response may be based on the confirmation of the mobility request (sent at 802) and the random access request.

At 810 the target cell entity may receive, via the resources indicated at 808, a radio resource control request. The target cell entity may associate the identity of the UE sending a RRC request via the resources indicated at 808 with stored UE context information received from the source cell entity. The target cell entity may reconfigure the UE based on the context information. The RRC request may be as described previously.

In some cases of handover, during or after a PDSCH command transmission (e.g. a handover command transmitted via PDSCH), the source cell entity may receive feedback (e.g. L1 HARQ) from the UE to acknowledge the PDSCHs associated with the PDSCH command were received correctly by the UE, but it may not receive an RLC ACK. This can lead to a situation where the source cell entity is uncertain of whether the UE received the PDSCH command correctly.

In some examples of the present disclosure, when a PDCCH command for mobility based on the above procedures is sent to a UE which has received a PDSCH command, the UE may prioritize the PDSCH command over the PDCCH command. The target cell entity may provide a RAR with an UL grant which may then be used by the UE for transmitting in the UL. Alternatively, the UE may send dummy data/padding.

The example procedures described above may be applicable to UEs in RRC connected and RRC inactive state. For inactive UEs the procedure may be employed to move UEs to different cells to enable for example energy savings for a cell in a given RAN notification area.

Some examples may provide improved mobility robustness by utilizing PDCCH command to trigger a UE to establish connection with a target cell entity. This may lead to reduced interruption times when handover command transmission fails or is likely to fail, and there may be no need for UE to perform cell selection since its redirected by the source cell entity. In some examples, contention free based access to a target cell may be performed in handover failure scenarios, which may further improve the robustness of the procedure.

Some examples may enable load balancing of inactive UEs in terms of their contexts and reserved resources. A Group Common PDCCH for PDCCH commands of mobility procedures may be utilized to enable quick offloading of a cell in e.g., cell shut down scenarios.

In some examples, a user equipment is provided comprising means for receiving, from a source cell entity, a physical downlink control channel command; and based on the physical downlink control channel command, initiating a random access procedure to one or more target cells.

In some examples, the user equipment may comprise at least one processor and at least one memory storing instructions that, when executed by the at least one processor, cause the user equipment at least to: receive, from a source cell entity, a physical downlink control channel command; and based on the physical downlink control channel command, initiate a random access procedure to one or more target cells.

In some examples, a source cell entity is providing comprising means for: sending, to one or more target cell entities, a mobility request for the user equipment; receiving, from at least one of the one or more target cell entities, confirmation of the mobility request; and based on the received confirmation of the mobility request, sending, to the user equipment, a physical downlink control channel command.

In some examples, the source cell entity may comprise at least one processor and at least one memory storing instructions that, when executed by the at least one processor, cause the source cell entity at least to: send, to one or more target cell entities, a mobility request for the user equipment; receive, from at least one of the one or more target cell entities, confirmation of the mobility request; and based on the received confirmation of the mobility request, send, to the user equipment, a physical downlink control channel command.

In some examples, a target cell entity is provided comprising means for: receiving, from a source cell entity, a mobility request for a user equipment; sending, to the source cell entity, confirmation of the mobility request; receiving, from the user equipment, a random access channel request; and based on the confirmation of the mobility request and the received random access channel request, sending, to the user equipment, a random access channel response comprising information indicating an uplink and/or downlink grant.

In some examples, the target cell entity may comprise at least one processor and at least one memory storing instructions that, when executed by the at least one processor, cause the target cell entity at least to: receive, from a source cell entity, a mobility request for a user equipment; send, to the source cell entity, confirmation of the mobility request; receive, from the user equipment, a random access channel request; and based on the confirmation of the mobility request and the received random access channel request, send, to the user equipment, a random access channel response comprising information indicating an uplink and/or downlink grant.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. A user equipment, comprising:
   at least one processor; and
   at least one memory storing instructions that, when executed with the at least one processor, cause the user equipment at least to:
      receive, from a source cell entity, a physical downlink control channel command; and
      based on the physical downlink control channel command, initiate a random access procedure to one or more target cells, wherein the physical downlink control channel command comprises target cell information of the one or more target cells and a dedicated preamble identifier, and the target cell information indicates an absolute radio frequency number of a target cell of the one or more target cells.

2. The user equipment of claim 1, wherein the physical downlink control channel command comprises integrity information, and wherein the instructions, when executed with the at least one processor cause the user equipment to perform an integrity check of the physical downlink control channel command based on the integrity information and initiate the random access procedure based on a result of the integrity check.

3. The user equipment of claim 1, wherein the instructions, when executed with the at least one processor, cause the user equipment to:
   send, to a target cell entity providing at least one of the one or more target cells, a random access channel request.

4. The user equipment of claim 3, wherein the instructions, when executed with the at least one processor cause the user equipment to:
   receive, from the target cell entity, a random access channel response comprising information indicating at least one of an uplink or downlink resource grant.

5. The user equipment of claim 3, wherein the random access channel request comprises a dedicated preamble corresponding to the dedicated preamble identifier.

6. The user equipment of claim 4, wherein the instructions, when executed with the at least one processor, cause the user equipment to:
   send a radio resource control request to the target cell entity based on the indicated uplink resource grant.

7. The user equipment of claim 6, wherein the radio resource control request comprises one of:
   a re-establishment request;
   a resume request;
   a handover request; or
   a redirection request.

8. The user equipment of claim 1, wherein the physical downlink control channel command comprises an indication that the user equipment is to perform contention based random access to the one or more target cells, and wherein the instructions, when executed with the at least one processor, cause the user equipment to perform the contention based random access.

9. The user equipment of claim 1, wherein the physical downlink control channel command comprises information identifying a plurality of target cells.

10. The user equipment of claim 9, wherein the instructions, when executed with the at least one processor, cause the user equipment to select the one or more target cells from the plurality of target cells in response to receiving the physical downlink control channel command.

11. The user equipment of claim 1, wherein the instructions, when executed with the at least one processor, cause the user equipment to perform a cell selection procedure to determine the one or more target cells.

12. The user equipment of claim 1, wherein the physical downlink control channel command comprises a physical downlink control channel order.

13. A source cell entity, comprising:
at least one processor; and
at least one memory storing instructions that, when executed with the at least one processor, cause the source cell entity at least to:
  send, to a user equipment, a physical downlink control channel command to enable the user equipment to initiate a random access procedure to one or more target cells,
  wherein the physical downlink control channel command comprises target cell information of the one or more target cells and a dedicated preamble identifier, and the target cell information indicates an absolute radio frequency channel number of a target cell of the one or more target cells.

14. The source cell entity of claim 13, wherein the instructions, when executed with the at least one processor, cause the source cell entity to:
  send, to one or more target cell entities, a mobility request for the user equipment; and
  receive, from at least one of the one or more target cell entities, confirmation of the mobility request, where the sending of the physical downlink control channel command is based on the received confirmation of the mobility request.

15. The source cell entity of claim 14, wherein the mobility request comprises user equipment context information, and wherein the confirmation of the mobility request comprises confirmation of user equipment context transfer including the dedicated preamble identifier for use in the physical downlink control channel command.

16. The source cell entity of claim 14, wherein the confirmation of the mobility request comprises a first dedicated preamble identifier of a first dedicated preamble for use in the physical downlink control channel command and a second dedicated preamble identifier of a second dedicated preamble for use in a physical downlink shared channel command.

17. The source cell entity of claim 16, wherein the instructions, when executed with the at least one processor, cause the source cell entity to:
  determine to use the first dedicated preamble based on one or more requirements associated with the user equipment; and
  in response to determining to use the first dedicated preamble, send, to the user equipment, the physical downlink control channel command.

18. The source cell entity of claim 13, wherein the physical downlink control channel command comprises integrity information.

19. The source cell entity of claim 13, wherein the physical downlink control channel command comprises a physical downlink control channel order.

20. A method, comprising:
  receiving, from a source cell entity, a physical downlink control channel command; and
  based on the physical downlink control channel command, initiating a random access procedure to one or more target cells, wherein the physical downlink control channel command comprises target cell information of the one or more target cells and a dedicated preamble identifier, and the target cell information indicates an absolute radio frequency channel number of a target cell of the one or more target cells.

* * * * *